Figure 1:
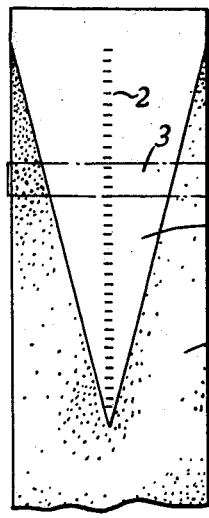

June 15, 1965 F. H. WOOD 3,188,998
DISPLAY OF INFORMATION
Filed Aug. 30, 1962 4 Sheets-Sheet 1

INVENTOR
F. H. Wood
BY Wenderoth
Lind & Ponack, ATTORNEYS

June 15, 1965  F. H. WOOD  3,188,998
DISPLAY OF INFORMATION
Filed Aug. 30, 1962  4 Sheets-Sheet 2

INVENTOR
F. H. Wood
BY Wenderoth
Lind & Ponack, ATTORNEYS

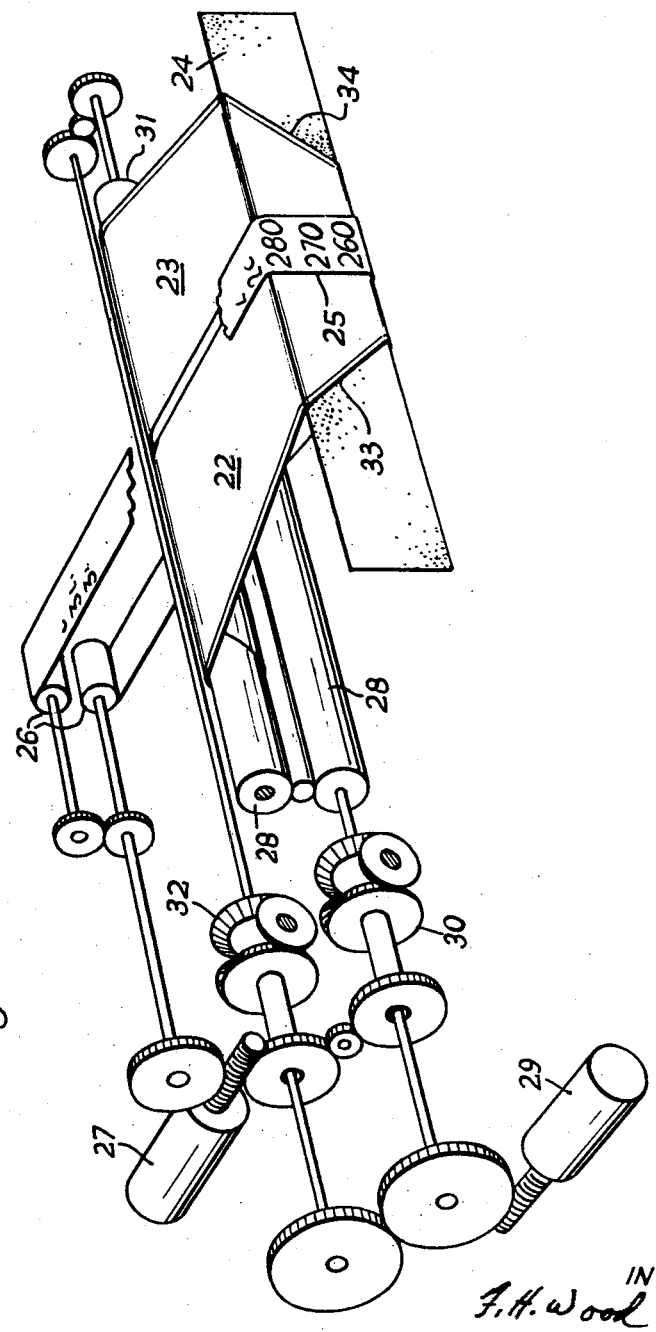

June 15, 1965   F. H. WOOD   3,188,998
DISPLAY OF INFORMATION
Filed Aug. 30, 1962   4 Sheets-Sheet 4

INVENTOR
F. H. Wood
BY Wenderoth
Lind & Ponack ATTORNEYS 3,188,998
DISPLAY OF INFORMATION
Francis Harold Wood, Watford, England, assignor to Elliott Brothers (London) Limited, London, England
Filed Aug. 30, 1962, Ser. No. 220,468
Claims priority, application Great Britain, Sept. 1, 1961, 31,607/61
3 Claims. (Cl. 116—129)

It is sometimes required to display information, for example a variable quantity, in such a manner that the order of the quantity is given to an observer as an analogue together with a quantitative reading. In such cases it is the usual practice to display the analogue as an angle between two pointers or between a pointer and a datum mark, or to provide a separate portion of the display as an analogue together with some form of read out information.

It is also sometimes required that the observer has to relate two or more separate quantities which may have a linear or a non-linear relationship between them. The usual practice of relating these quantities is to read them from separate displays and relate the quantities mentally or to mix the quantities in a mechanical or electrical computer and display the ratio of one to another or the difference between them.

The above mentioned methods have many disadvantages in that much mental effort is called for in arriving at a satisfactory conclusion. The mental effort involved in extracting the required information adds to the work load of the observer who may be very near being overloaded. A classic example of this is the work load of the pilot of an aircraft during the approach and landing of his aircraft. Information is being given to him at an increasing rate as the approach progresses and the relationship between many variables is changing non-linearly. This calls for much mental effort, and mis-calculation and impaired judgment can result from this mental overload.

It is the object of the present invention to provide a method by which information can be conveyed to an observer in such a way that the most important information can be extracted in the shortest possible time whilst still allowing more detailed information to be extracted if it is required at the expense of an increase in the reading time which, however, has to be kept to a minimum.

This is accomplished, according to the method of this invention, by presenting the variable quantities with a common analogue connection which follows the relationship law between them.

If desired, two or more quantities may be displayed which each co-operate with the same basic analogue display but so as to convey different information.

The invention also consists in a method of presenting information in which one quantity, for example the output of a system, is presented as a basic analogue and other quantities, relating for example to the input to the system, are presented on the display in such manner that when conditions are satisfactory such quantities appear to be gated within the basic analogue and are central thereon when conditions are optimum. Conveniently the basic analogue is displayed in the form of a pattern the width or area of which varies.

Some embodiments of the invention will now be described with reference to the accompanying drawings in relation to the display of height and other information to the pilot of an aircraft.

Figure 2:
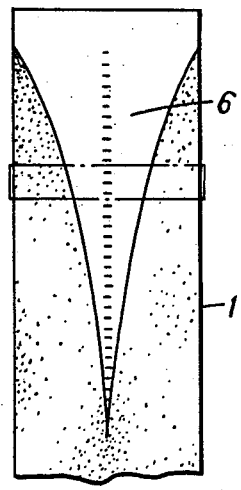
Figure 3A:
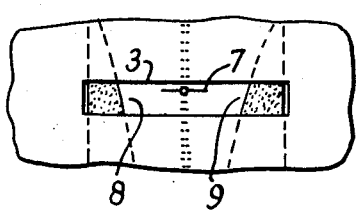
Figure 3B:
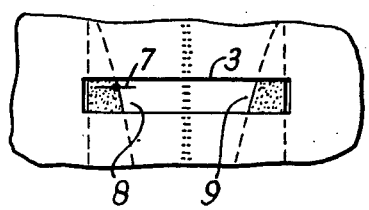
Figure 7A:
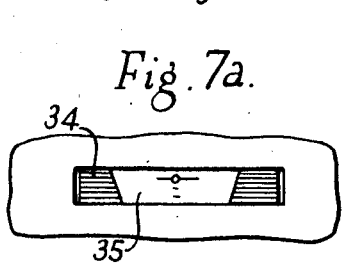
Figure 7B:
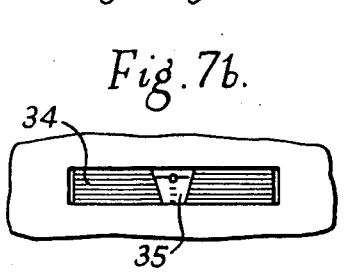
Figure 4:
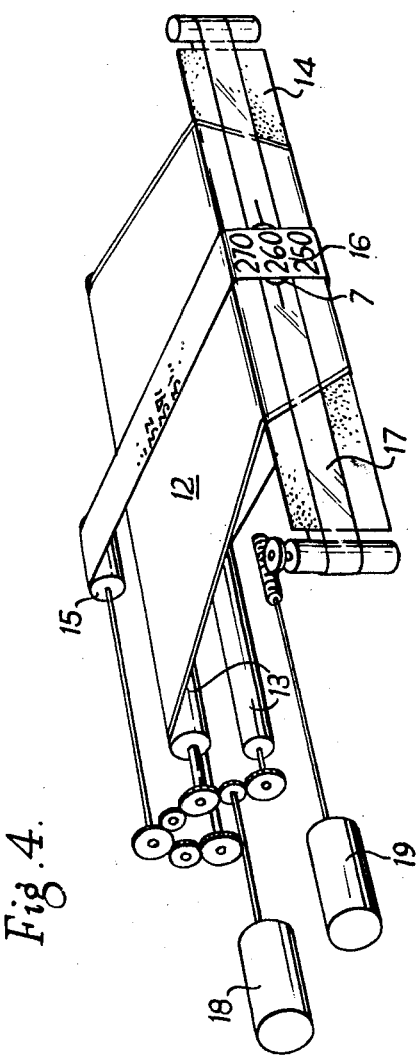
Figure 6A:
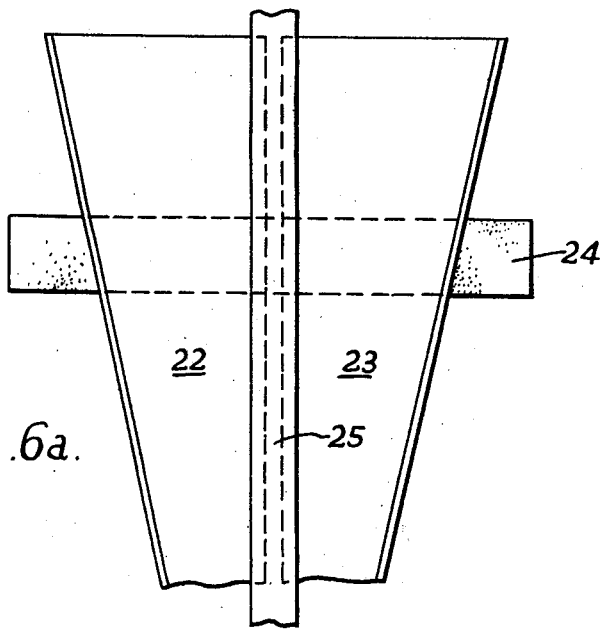
Figure 6B:
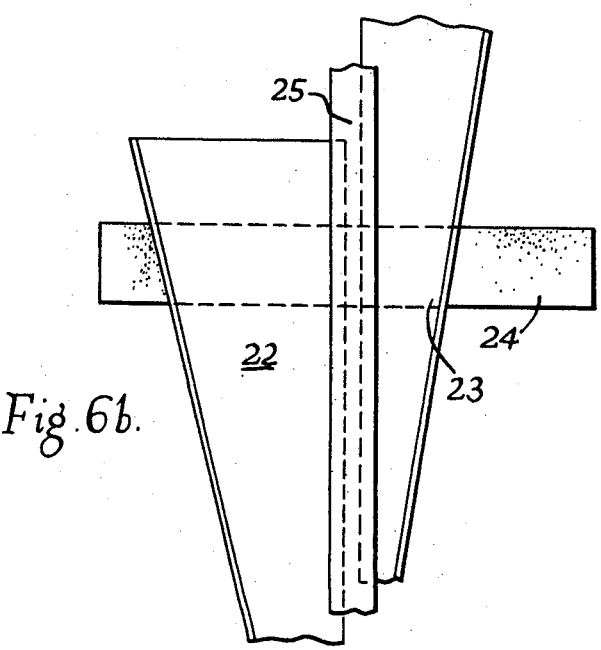

In the drawings:
FIGURE 1 illustrates one embodiment of the invention in diagrammatic form for the purpose of explanation,
FIGURE 2 illustrates a modification of the embodiment of FIGURE 1,
FIGURES 3a and 3b show different aspects of a display provided by another embodiment of the invention,
FIGURE 4 shows a diagrammatic perspective view of an instrument providing the display of FIGURES 3a and 3b,
FIGURE 5 shows a diagrammatic perspective view of an instrument for displaying in another form the information displayed by the embodiment of FIGURES 3a and 3b.
FIGURES 6a and 6b illustrate parts of the instrument of FIGURE 5 in alternative positions, and
FIGURES 7a and 7b show different aspects of a display provided by a further embodiment of the invention.

In the embodiment illustrated in FIGURE 1, height information is supplied to the servo mechanism of an instrument which positions a blind 1 which is calibrated in height, preferably in FIGURE 2, such that one figure representing the actual height is readable in the centre of means defining a display area 3 and at the same time two other figures, one above and one below the actual height figure are also visible. The servo system is preferably so geared such that the figures are still readable when the servo system is being operated at maximum speed. The blind width is substantially the full width of the display. Equally disposed either side of the longitudinal centre line of the blind is a section substantially in triangular form which is in contrast to the rest of the blind such as a white sector 4 on a black background 5, the two sections combining to form a longitudinally tapered member. The width of this white sector as seen through the display area provides an analogue of the height reading. The blind being positioned with respect to height relative to the front of the display area 3 will now display a black background on which is superimposed a central white section having black numerals in its centre; the width or area of the white section bearing a definite relationship to the numeral displayed in the centre. The change in area with respect to the displayed numeral may be controlled by the shape of the substantially triangular section. A change in height will result in an apparent movement inwards or outwards to or from the centre line of the instrument of the edge line of the white display section. The arrangement described permits the display of height, which is a vertical component, in an instrument which is in the horizontal plane. This is possible because the numerals are moving in the correct and natural sense whilst the analogue of this quantity, the width of the visible white section, is displayed in the horizontal plane and is balanced about the centre line of the display. The picture given to the pilot is as though a calibrated triangle is in front of him with the apex resting on the ground and he is viewing it through a horizontal slit in the aircraft.

A further development of this method illustrated in FIGURE 2 is to shape the basic triangle 6 to conform to a particular law which can now be used to bias the analogue (ratio of white to black) in such a way that the task of relating another quantity to height is made much easier and therefore the relationship established quicker and with less possibility of error.

It will be appreciated that the blind 1 of FIGURES 1 and 2 need not consist of the black and white portions as shown. Instead, and as used in an embodiment of the invention to be described below, the blind could consist only of the white section which is moved over a stationary black background.

In a further embodiment the method of this invention may be used to display two or more quantities in the same display whilst using the same basic analogue for each piece of information. An example of this will now be given in which a second quantity is displayed in the instrument of FIGURE 1.

Assuming the pilot of the aircraft is on an approach manoeuvre he will require an indication of deviation from the centre line of an azimuth guidance radio beam.

The possibility of recapture of the radio beam centre lines varies as a function of both height and actual displacement. When these two quantities are displayed separately it is a difficult task to determine when the recapture possibility has reduced to zero, requiring much continual mental assessment and finally calling for judgment mainly from past experience.

It is the object of this further embodiment to provide a display such that while basic information is still available in the form of an analogue of height, and an actual readout of height, the actual radio beam centre line displacement and an analogue of the recapture possibility at all times is also provided.

This feature of "gating" the recapture possibility is accomplished as described below with reference to the embodiment of FIGURES 3a and 3b.

A servo mechanism receives information regarding radio beam displacement and thereby positions reference position means in the form of a marker 7 in the means, such as an apertured plate 3a, defining the display area 3. The marker becomes central on the display when the displacement from the radio beam is zero. Displacement to the left or right of the centre line moves the marker correspondingly left or right in a calibrated manner. The law coupling height and beam displacement is introduced to the basic triangle of the height display such that if the marker is still within the area indicating the height analogue a recapture of the beam centre line is still possible. If the marker goes outside the analogue area a recapture is not possible or at least inadvisable. Preferably the marker should be in the form of a white silhouette of a model aircraft with its centre lines picked out in black. Whilst the model 7 is moving over the white analogue background, only the centre black lines are seen (FIGURE 3a) and it is therefore a "quiet" form of display indicating a "safe" condition. Should the model be placed over the black background (FIGURE 3b) the larger area of the white form now becomes a "loud" display indicating an "unsafe" condition.

It is preferable that the marker or model 7 should not interfere with the numerical read out of height although it should be superimposed on the height analogue.

It will be seen that the sides 8, 9 of the white area act as "gating" lines for the information represented by the marker 7 showing a safe condition when the marker is between them and an unsafe condition when the marker moves outside.

FIGURE 4 shows in perspective one form of an instrument for providing a display of the kind shown in FIGURES 3a and 3b.

The instrument includes a blind 12 of triangular shape which extends between take-up rollers 13 over a plane rectangular surface 14 which represents the display area 3 (FIGURE 3) and the colour of which contrasts with the colour of the blind. Extending over the central longitudinal axis of the blind and between take-up rollers 15 is a narrow tape 16 carrying numerical read out data. Extending over blind 12 in a transverse direction but under tape 16 is a transparent tape 17 which carries the marker 7 (of FIGURE 3) and which is hidden below tape 16 when it is in a central position. The blind 12 and tape 16 are driven by moving means in the form of a motor 18 to which height information is fed while transparent tape 17 is driven by further moving means in the form of a motor 19 to which azimuth information, i.e. radio beam displacement, is fed.

The foregoing description is of a display of azimuth wander using an outside-in display. To provide an inside-out display of the same quantity, the analogue of height area is moved from side to side as a function of azimuth displacement, leaving the numerical height read out or a symbolic aircraft central in the whole display. The method of achieving this display is to split the analogue of height into two separate halves such that each side may be moved differentially as a function of azimuth displacement, whilst at the same time moving them in sympathy as a function of height. The splitting of the height analogue will require that the numerical read out of height be on a separate tape which is actuated by height information only.

An instrument of this kind will now be described with reference to FIGURE 5 and FIGURES 6a and 6b. As shown, the instrument comprises two blinds 22 and 23 each having the shape of a right-angled triangle and disposed with their perpendicular sides adjacent and parallel. Each blind extends between a pair of take-up rollers and passes over a plane rectangular surface 24 of contrasting colour and which represents the display area. Extending over the centre of the blinds 22 and 23 and across the centre of the display area is a narrow tape 25 which carries numerical read out data. The take-up rollers 26 for the tape 25 are driven directly by a first driving means in the form of a motor 27 to which height information is fed. The take-up rollers 28 for blind 22 are driven by motor 27 and also by a second driving means in the form of a motor 29 to which azimuth information is fed through a first differential 30 while the take-up rollers 31 for blind 23 are driven by motors 27 and 29 through a second differential 32. In operation, if the azimuth displacement is zero, the two blinds 22 and 23 will be in similar positions and the gating lines represented by their edges 33, 34 will be symmetrical about the centre line of the display; FIGURE 6a illustrates this condition. If the height changes, motor 27 causes both blinds to move together and with the tape 25. If, however, there is a displacement in azimuth, the motor 29 will cause the two blinds to move differentially even if the height is changing, thus causing the white area of the display to appear to move to the left or the right relative to the centre line of the display according to the direction of displacement; FIGURE 6b illustrates this state of affairs.

In a further embodiment of the invention a third quantity is introduced into the display provided by the embodiment of FIGURE 3.

It is well known that during an approach or landing manoeuvre the aircraft control response progressively deteriorates. Any director information fed to the pilot, i.e. instructions to be acted on by the pilot, therefore becomes more important as the manoeuvre progresses.

The progress of an approach and the director information importance can therefore be determined as a function of height. This feature is used to present director information to the pilot in such a way that it becomes more apparent as the height decreases.

As shown in FIGURES 7a and 7b, director information 34 is displayed on each side of the height analogue over an area which now increases at the same rate as the height analogue 35 decreases in area. This then is now an analogue of the director information importance.

The actual nature of the director information display will be selected according to the information to be displayed but in one form in which the information represents departure from centre-line of the pitch radio-guidance beam, this information is displayed as a series of lines as shown which disappear if the departure is zero but which reappear and move upwards or downwards as a function of departure from said centre-line and at a speed which is proportional to the magnitude of the error.

Although the above described embodiments of the invention all relate to a particular type of instrument for use primarily in providing height information to the pilot of an aircraft, it will be appreciated that the type of display described may be achieved by other means and that the invention may be used for many other purposes.

Any system which has a number of variables to display which in turn are inter-related can be displayed according to the method of this invention. One possible example is the display of engine conditions where the output of the engine would be the basic analogue and the variables contributing to that output are "gated" to be within the output analogue and optimum performance being obtained when everything is central.

Again, in process control the quality of the output would be the basic analogue whilst the input variables would be "gated" within the output analogue for satisfactory performance and centralised for optimum performance.

I claim:

1. Apparatus for displaying information, comprising means defining a display area, a first longitudinally tapered member extending longitudinally across said display area defined by said means defining the display area, a second longitudinally tapered member extending longitudinally across said display area, said members extending edge to edge and being movable longitudinally across said area, first driving means coupled to said members for moving said members in unison for providing a field of variable width corresponding to a first said variable quantity, and second driving means coupled to said members for moving said members differentially for providing a lateral displacement of said field corresponding to the second said variable quantity, whereby there is displayed information concerning two related variable quantities in analogue form wherein one quantity is represented by a field of variable width and the other quantity is represented by an apparent lateral movement of said field.

2. Apparatus for displaying information, comprising a means defining a rectangular display area of one color, two longitudinally tapered blinds of a contrasting color extending longitudinally across said display area, said tapered blinds extending edge to edge, a tape carrying quantitative information extending longitudinally across said display area, first driving means coupled to said tape for moving said tape longitudinally across said area, second driving means coupled to said blinds for effecting longitudinal movement of said blinds in unison for providing a field of variable width representing in analogue form a first variable quantity, and differential means coupled to said blinds for effecting differential longitudinal movement of said blinds for providing a lateral displacement of said field of variable width representing in analogue form a second variable quantity.

3. Apparatus for displaying information, comprising a means defining a display area, reference position means in the display area of said means defining the display area, a longitudinally tapered member extending longitudinally across said display area, moving means coupled to said tapered member for moving said member longitudinally across said display area for providing a field of variable width corresponding to a first variable quantity, and further moving means coupled to said reference position means for moving said reference position means laterally relative to said tapered member for causing relative lateral movement between said field and said reference position means for displaying a second variable quantity whereby there is displayed information.

References Cited by the Examiner
UNITED STATES PATENTS 1,797,772  3/31  Hickman _____ 116—129
1,935,021  11/33  Engblom et al. _____ 235—86

FOREIGN PATENTS 8,371  7/02  Austria.

LOUIS J. CAPOZI, *Primary Examiner.*